(12) United States Patent
Bang et al.

(10) Patent No.: US 11,177,495 B2
(45) Date of Patent: Nov. 16, 2021

(54) EVAPORATOR FOR A FUEL CELL SYSTEM

(71) Applicant: SERENERGY A/S, Aalborg (DK)

(72) Inventors: Mads Bang, Skorping (DK); Anders Risum Korsgaard, Aalborg (DK)

(73) Assignee: SERENERGY A/S, Aalborg (DK)

( * ) Notice: Subject to any disclaimer, the term of this patent is extended or adjusted under 35 U.S.C. 154(b) by 890 days.

(21) Appl. No.: 15/325,047

(22) PCT Filed: Jul. 16, 2015

(86) PCT No.: PCT/DK2015/000027
§ 371 (c)(1),
(2) Date: Jan. 9, 2017

(87) PCT Pub. No.: WO2016/008488
PCT Pub. Date: Jan. 21, 2016

(65) Prior Publication Data
US 2017/0237098 A1 Aug. 17, 2017

(30) Foreign Application Priority Data

Jul. 16, 2014 (DK) .............................. PA201400385

(51) Int. Cl.
*H01M 8/06* (2016.01)
*H01M 8/04* (2016.01)
(Continued)

(52) U.S. Cl.
CPC ........... *H01M 8/0631* (2013.01); *B01B 1/005* (2013.01); *B01D 1/0058* (2013.01); *C01B 3/323* (2013.01);
(Continued)

(58) Field of Classification Search
None
See application file for complete search history.

(56) References Cited

U.S. PATENT DOCUMENTS

| 3,279,525 A | 10/1966 | Takahashi |
| 3,745,047 A | 7/1973 | Fanciullo et al. |

(Continued)

FOREIGN PATENT DOCUMENTS

| DE | 2157722 A1 | 7/1972 |
| DE | 102007030605 A1 | 1/2009 |

(Continued)

OTHER PUBLICATIONS

PCT International Search Report for PCT International Patent Application No. PCT/DK2015/000027, dated Nov. 11, 2015.

*Primary Examiner* — Jonathan Crepeau
*Assistant Examiner* — Angela J Martin
(74) *Attorney, Agent, or Firm* — Holland & Hart LLP

(57) ABSTRACT

A fuel cell system comprising a fuel cell stack, an evaporator for evaporating a mixture of methanol and water to be forwarded through a catalytic reformer for producing portions of free hydrogen. The fuel cell stack being composed of a number of proton exchange membrane fuel cells each featuring electrodes in form of an anode and a cathode for delivering an electric current. The system provides an enhanced system for evaporating the liquid fuel using a pre-evaporator, which partly evaporates the fuel, followed by a nozzle, which atomizes the fuel into a fine mist, before being passed to the final evaporation zone. This configuration ensures minimal fuel accumulation in the system and fast load transition's.

20 Claims, 4 Drawing Sheets

(51) Int. Cl.
*B01B 1/00* (2006.01)
*C01B 3/32* (2006.01)
*H01M 8/0612* (2016.01)
*B01D 1/00* (2006.01)
*H01M 8/04014* (2016.01)

(52) U.S. Cl.
CPC ..... *H01M 8/04022* (2013.01); *H01M 8/0618* (2013.01); *C01B 2203/0233* (2013.01); *C01B 2203/066* (2013.01); *C01B 2203/1223* (2013.01); *C01B 2203/1288* (2013.01)

(56) References Cited

U.S. PATENT DOCUMENTS

| | | | | |
|---|---|---|---|---|
| 6,159,434 A | * | 12/2000 | Gonjo | B01J 10/007 422/200 |
| 2003/0217506 A1 | * | 11/2003 | Dieckmann | C10L 1/2383 44/412 |
| 2010/0062299 A1 | * | 3/2010 | Son | B01J 8/0278 429/425 |
| 2011/0256491 A1 | * | 10/2011 | Edlund | B01J 8/0221 431/207 |

FOREIGN PATENT DOCUMENTS

| | | | | |
|---|---|---|---|---|
| EP | 0861802 | * | 9/1998 | ............. B01J 10/00 |
| EP | 0861802 A2 | | 9/1998 | |
| EP | 2168645 A1 | | 3/2010 | |
| JP | S6246902 A | | 2/1987 | |
| WO | 2010022732 A1 | | 3/2010 | |

* cited by examiner

EVAPORATOR FOR A FUEL CELL SYSTEM

TECHNICAL FIELD

The present invention is generally concerned with the art of generating electrical energy by means of fuel cells. More specifically, it relates to a fuel cell system comprising a fuel cell stack, an evaporator for evaporating a mixture of methanol and water to be fed through a catalytic reformer for producing portions of free hydrogen, the fuel cell stack being composed of a number of proton exchange membrane fuel cells each featuring electrodes in form of an anode and a cathode for delivering an electric current, the reaction of free hydrogen into ionic form with contact to the anode being proportional to the flow of electric current between the electrodes.

BACKGROUND OF THE INVENTION

Electrochemically, a fuel cell converts a raw fuel into electrical energy and heat and will continue the production as long as raw fuel is being continuously supplied.

The basic conversion technology of fuel cells is well known for at least a century but has come into a renaissance with the latest development and demands for fuel saving and environmental friendly technology. Additionally fuel cell technology is advantageous for electrical supply on mobile or remote platforms and for backup solutions.

Briefly explained, using the protone exchange membrane technology, a fuel cell needs a supply of hydrogen to be passed along a first electrode, forming the anode, and a supply of oxygen, typically taken directly as atmospheric air, to be passed along a second electrode, forming the cathode. Arranged between the electrodes is an ion-conducting layer, typically a polymer film comprising platine and phosphoric acid. Supplying the hydrogen and oxygen, generates an electrical voltage between the electrodes and a current will be able to flow between the electrodes and supply an attached electrical consumer. Corresponding to the draw of current, a number of hydrogen and oxygen molecules will react, and later when combined in the exhaust the hydrogen ions and oxygen will form water as the end product. Additionally the system will generate heat.

Since the necessary oxygen supply is achieved by taking in sufficient amounts of oxygen containing atmospheric air, the overall need for utilizing a fuel cell is to form a steady and sufficient supply of hydrogen. Supplying hydrogen can possibly be from pressurized cylinders, small or large, but the distribution and storage is critical since hydrogen is a highly explosive gas. Pressurizing hydrogen is quite energy consuming and even in pressurized form hydrogen takes up relatively much space. A better solution is to generate hydrogen directly on the spot by conversion of more stable forms of fuel into a synthetic gas containing high amounts of hydrogen, hereafter called a syngas.

Appreciated is the process of using methanol for producing the hydrogen containing syngas for the obvious advantages when it comes to distribution. The technology describe both low and high temperature fuel cell stacks where a temperature of 120 degrees celcius is the temperature for which the split between the technologies is commonly understood. More specifically a low temperature system commonly works in the temperature area around 70 degrees Celcius and the high temperature system at around 160 degrees Celcius. However, for both technologies apply that the process requires a reformer, for processing the fuel and supplying a syngas containing free hydrogen. The fuel processed is methanol in an aquatic solution, herafter referenced as liquid fuel. In a first stage, a heater evaporates the liquid fuel and the gas is forwarded to the reformer. The reformer includes a catalyst including copper, which in addition to heat converts the liquid fuel into a syngas mainly consisting of hydrogen with a relatively large content of carbon dioxide and a small content of water mist and carbon monoxide. The syngas is directly useable as a fuel supply for supplying the fuel cell.

WO2010/022732 to Dantherm Energy describe a fuel cell system featuring an evaporator for evaporating the fuel into a gas to be forwarded to the reformer. The evaporator features a zig-zagging evaporator channel being heated by the exhaust of the fuel cell system. As such the feature solves the technical problem of evaporating the liquid fuel but leaves some disadvantages unsolved as described as follows.

One of the challenges of regulating the electrical energy production of the fuel cell is to achieve a quick response to the input of fuel in the system. It is not satisfactory if the system is to slow to respond to a sudden need for extra electrical effect.

Investigations encountered that the regulation speed of the system highly depends on how quick and efficient the system is to heat and vaporize the fluid fuel supplied into the system. If the system cannot quickly produce syngas, the regulation is to slow and amounts of fluid fuel can build in the evaporator. The presence of fluid fuel in the evaporator will lead to a slow regulation of the fuel cell system and further a waste of fuel in case the wish is to regulate down the electrical effect.

JP 62-46902 (A) addresses this topic and suggests the evaporation channels designed as a coiled tube with an increasing cross section along the travel of the tube. In this way, it allows the heated liquid fuel to expand into gas and as such prevent the pressure to be so high as to condense the gas back into a liquid before delivery to the fuel cell stack. However, this buildup does not fully solve the underlying problem of achieving a quick regulation.

One way of optimizing the evaporator could be by using an atomizer unit or a jet pump for injecting the liquid fuel into the evaporator for evaporation as suggested in DE 2157722 C2. However, an atomizer unit relies on a constant pressure, which will need the presence of a compressor. This will make the system even more complicated and expensive, and there will be a constant energy demand for supplying the compressor, which will influence the overall efficacy of the system.

Thus, considering the challenges of providing an evaporator that fully evaporates the liquid fuel into a gas, there is a need for an improvement when it comes to the design of the evaporator with a regulation that responds quickly to the supply of liquid fuel, but without the explained disadvantages of the prior art.

SUMMARY

The overall object of the present invention is to provide a fuel cell system with a regulation that avoids fuel accumulation in system and feature a fast load transition.

This is according to the invention achieved by adding the technical features of the evaporator in the fuel cell system as explained in claim 1.

More specifically the fuel cell system comprises:

A fuel cell stack, a catalytic reformer, an evaporator for evaporating a mixture of methanol and water to be fed through the catalytic reformer for producing portions of free hydrogen, the fuel cell stack being composed of a number of proton exchange membrane fuel cells each featuring electrodes in form of an anode and a cathode for delivering an electric current, the reaction of free hydrogen into ionic form with contact to the anode being proportional to the flow of electric current between the electrodes where the evaporator includes a first section that serves as a pre-evaporator being specially adapted for receiving the liquid fuel and facilitating a partly evaporation and split-up of the liquid fuel into drops, droplets and mist.

More specifically this is achieved by forming the pre-evaporator as a well like cavity into which the fluid fuel because of gravity can splash down and be separated into fragments.

This approach and design is thus very different from prior art evaporator designs suggesting a channel forming a worm or a zig-zagging path where the pathways are arranged primarily in the horizontal direction. The evaporation into gas by the prior art designs are thus done primarily by heating a coherent amount of fluid fuel and not by mechanical split-up of the fluid fuel into smaller fragments as droplets, mist and gas as achieved by the pre-evaporator.

More explicitly the cavity is arranged with walls that are shaped substantially vertically or shaped in various forms in order to provide a larger surface area of the wall. The walls can be shaped with edges or drop noses that serve to split-up the liquid fuel into drops, droplets and mist when the liquid fuel are floating down the walls or splashing down through the cavity.

Investigations have shown that the efficiency of the first stage of the evaporator, the inlet section, has a great impact on the overall performance of the evaporator and the ability to regulate the fuel cell system. Thus, providing a pre-evaporator forming an enhanced inlet section of the evaporator that substitutes the jet pump for atomizing the fluid fuel will help to solve the outlined technical problem.

In an embodiment, the pre-evaporator is formed as a cavity with walls that are shaped in such a way that the walls propagation vertically are angled away from the straight vertical line. Thus, they form a channel in which the drops of the liquid fuel forced because of gravity ricochet from wall to wall atomizing and evaporating the drops of liquid fuel into drops, droplets and mist. In other words, the orientation of the pathway in the pre-evaporator is in normal operation shaped substantially vertical but with slightly angled walls from top to bottom.

It has to be understood, that the mentioned orientations are described relatively to a horizontal orientation where the fuel cell system as such are orientated in the orientation of normal intended operation.

Since heat is needed for the evaporation process, the walls are further adapted for serving as heating elements in order to enhance the evaporation process. The choice of a thermal conducting material facilitates this. Additionally the thermal heating of the walls rely on the extent of the surface that are subject to transfer of heat from an attached heat exchanging neighboring module.

In a further embodiment, rod formed heating elements protruding out into the channel are arranged in the cavity of the pre-evaporator. The rod formed heating elements can protrude in all directions crossing the cavity of the pre-evaporator.

The evaporator module comprising the pre-evaporator and the evaporator, is in an appreciated embodiment arranged as a sandwich module in such a way that thermal energy can be supplied from both sides. More specifically, the sandwich is such arranged that on at least one side a heating element is applied, the heating element being heated subject to heat from a flow of refrigerant that has been passed through the cooling arrangement of the fuel cell stack and/or subject to heat transmitted from the exhaust system.

The heat exchanger for exchanging thermal heat between the cooling system of the fuel cell stack and the evaporator module will in an embodiment be using a glycol based refrigerator.

The heat exchanger for exchanging thermal heat between the exhaust gas and the evaporator module is arranged with thermal absorbing fins that takes up thermal energy from the exhaust gas when this is passed along the fins.

The effect of the arrangement of evaporator module and heat exchangers as a sandwich will be a fast transition from start of the system and into normal power producing operation.

In one embodiment, the heat exchangers are arranged together on one side of the evaporator module. In another embodiment, the heat exchangers are arranged on each side of the evaporator module.

It is appreciated if the shape of the rod formed heating elements can be with a number of sides from triangular shaped over multisided until a substantially round shape is reached.

Further, the shape of the sides of the rod formed heating elements can vary from being flat to a curved or concave form. The curved or concave form will prolong the travel of liquid fuel floating over the surface. The result is that more liquid fuel will be evaporated.

Especially appreciated is an embodiment in which the edges, formed by the shape of the rod-formed heating elements or the shape of the walls, are forming a nose adapted for letting the remaining liquid fuel drip and thus because of gravity collide with protruding parts in the pre-evaporator cavity, this being a rod-like heating element or a wall. The nose can be applied on the rod-like heating element and/or on the wall.

When the drops of liquid fuel falls through the pre-evaporator, they split into smaller drops and ricochet between the walls of the channel and the rod-formed heating elements. The contact with the walls and the rod-formed heating elements is subject to evaporation and atomizing of the fuel into a mist.

In a special embodiment, the rod-formed heating elements are arranged in a matrix within the pre-evaporator cavity.

In a further embodiment the rod-formed heating elements are arranged as a grate comprising at least one rod-formed heating element.

The grate includes in an embodiment several rod-formed heating elements arranged side by side.

In a further embodiment the grate is formed as a net with several rod-formed heating elements arranged side by side and at least one, but possibly more, rod formed heating elements arranged side by side to form cross members to the first set of rod-formed heating elements. In one embodiment, the sets of rod-formed heating elements are forming joints where they cross each other.

The pre-evaporator can be separated into a number of chambers each comprising a gap for passing the liquid fuel drop, and negative angled substantially vertical portion of a wall followed by a positive angled substantially vertical portion of a wall followed by a gap that leads to the next chamber.

In an embodiment, the chamber has two mirrored sets of walls where the grate or matrix of rod-like heating elements are arranged in-between the walls.

As can be seen from the presented embodiments, the distance of travel through the pre-evaporator and the extend of the exposure of the liquid to the surface of the walls and heating rods supports the liquid fuel conforming into drops, droplets and atomized mist and as the fuel further travels through the channel into a fully evaporated gas.

In an embodiment, the gap between the chambers is adapted for forming a pressure nozzle for two-phase atomization of the liquid fuel into the following lower pressure chamber. Allowing the atomized liquid fuel to enter a chamber or cavity with a lower pressure supports the evaporation of the liquid into gas-form effectively.

In a special embodiment, a pressure-reducing nozzle for two-phase atomization forms the last outlet of the pre-evaporator cavity. A channel that is adapted to form a vertical channel for transporting the partly atomized and evaporated liquid fuel into an outlet that function as an inlet for a labyrinth-formed pathway channel follows the nozzle. The mixture of atomized fuel mist and evaporated fuel gas flows together in the vertical channel, trying to escape to the low-pressure cavities arranged further in the travel of the channel of the evaporator. It has the effect as to evaporate parts of the atomized fuel mist into gas and/or to blow the mist into the labyrinth-formed pathway channel. The labyrinth-formed pathway channel heats the evaporated fuel further and secures fully evaporation of the leftovers of the atomized fluid into gas. The walls of the channel including the labyrinth-formed pathway forms the heating elements for heating the evaporated fuel.

More specifically explained evaporation of liquid fuel demands energy in form of heat. Transformation from one phase (liquid) to a second phase (gas) means that water in gas-form expands in volume roughly 1000 times. The energy needed for atomization equals delta pressure times velocity factor of gas-expansion. Further the energy needed for atomization due to surface tension equals area of droplet times Sigma for the liquid fuel. In an embodiment, a heating panel heated electrically provides the energy needed for this two-phase atomization and evaporation, but in an appreciated embodiment, the surplus heat from the fuel cell stack and the waste gas burner serves this purpose of heating the evaporator.

Especially appreciated is an embodiment of the system where the components forms modules that fit together into a system in a modular way. The evaporator module can advantageously be formed out of one piece of material, preferably aluminum, which on one side is having the channels for the evaporator and on the other side is equipped with heat absorbing/transporting fins for taking up thermal energy from the other side. The thermal energy to be absorbed for providing evaporation of the liquid fuel can be supplied from the exhaust of the waste gas burner. Especially appreciated is if the exhaust from the waste gas burner is forwarded fully or partly along the fins of the evaporator module in order to achieve a better efficacy of the system. It has to be understood that the modules can be physically made using various methods of production, as e.g. die-casting or by carving out the channels of the modules in a machining process. The overlaying task is to form the evaporator module with its characteristic pathways on the first side forming the evaporator channel for evaporating the liquid fuel and on the second side forming the heating absorbing fins for taking up thermal energy for evaporating the liquid fuel.

The evaporator module can as explained, preferably be made of aluminum, but the use of other thermal heat conducting materials can be foreseen, such as alloys of iron, stainless steel, magnesium as well as ceramic materials.

BRIEF DESCRIPTION OF THE DRAWINGS

Embodiments of the invention will be described with reference to the accompanying drawing, in which.

DETAILED DESCRIPTION

Figure 1:
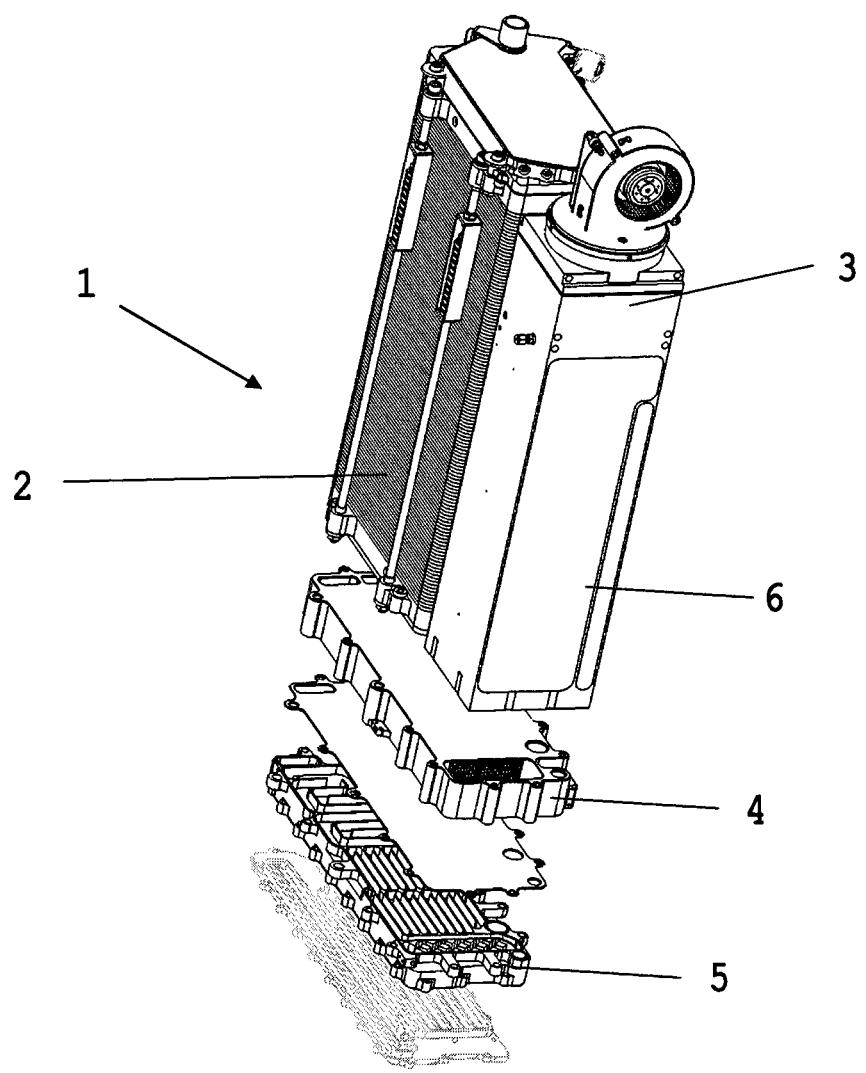
FIG. 1, shows an illustration of a fuel cell system.

FIG. 1, of the drawing shows a fuel cell system 1 comprising a fuel cell stack 2, a number of supporting modules for supplying the fuel cell stack 2 with a modified fuel enabling the fuel cell stack 2 to produce a steady flow of electrical current. The exceed gas supplied to the fuel cell stack 2 but not being converted into electrical current, is fed to the waste gas burner 3. The exhaust gas is under normal operating conditions in the temperature area of 500 degrees Celsius and the energy content is recycled for preparing the syngas for fueling the fuel cell stack 2. More detailed, the exhaust is forwarded through the heat exchanger module 4, which takes up the heat from the exhaust and transfer the heat to the neighboring module in the stack here being the evaporator module 5.

The liquid fuel, a mixture of methanol and water, is processed into a syngas consisting of free hydrogen for use in the fuel cell stack 2. In the evaporator module 5, the fuel is atomized and evaporated into the two-phase stage of the liquid fuel. Further, the evaporated gas is forwarded to the catalytic reformer module 6 that reforms the evaporated gas into a syngas consisting largely of free hydrogen. The catalytic reformer module 6 includes a catalyst including copper, which in addition to heat converts the evaporated liquid fuel into the syngas directly usable by the fuel cell stack 2. The exhaust heat of the fuel cell stack 2 and the waste gas burner 3 is led through channels in the evaporator module 5 and catalytic reformer module 6. The temperature demand in the catalytic reformer 6 is highest, so thus the catalytic reformer 6 is arranged directly behind the waste gas burner 3. At a later stage of the exhaust channel the evaporator module 5 takes up the heat from the exhaust in order to evaporate the liquid fuel into gas.

Figure 2:
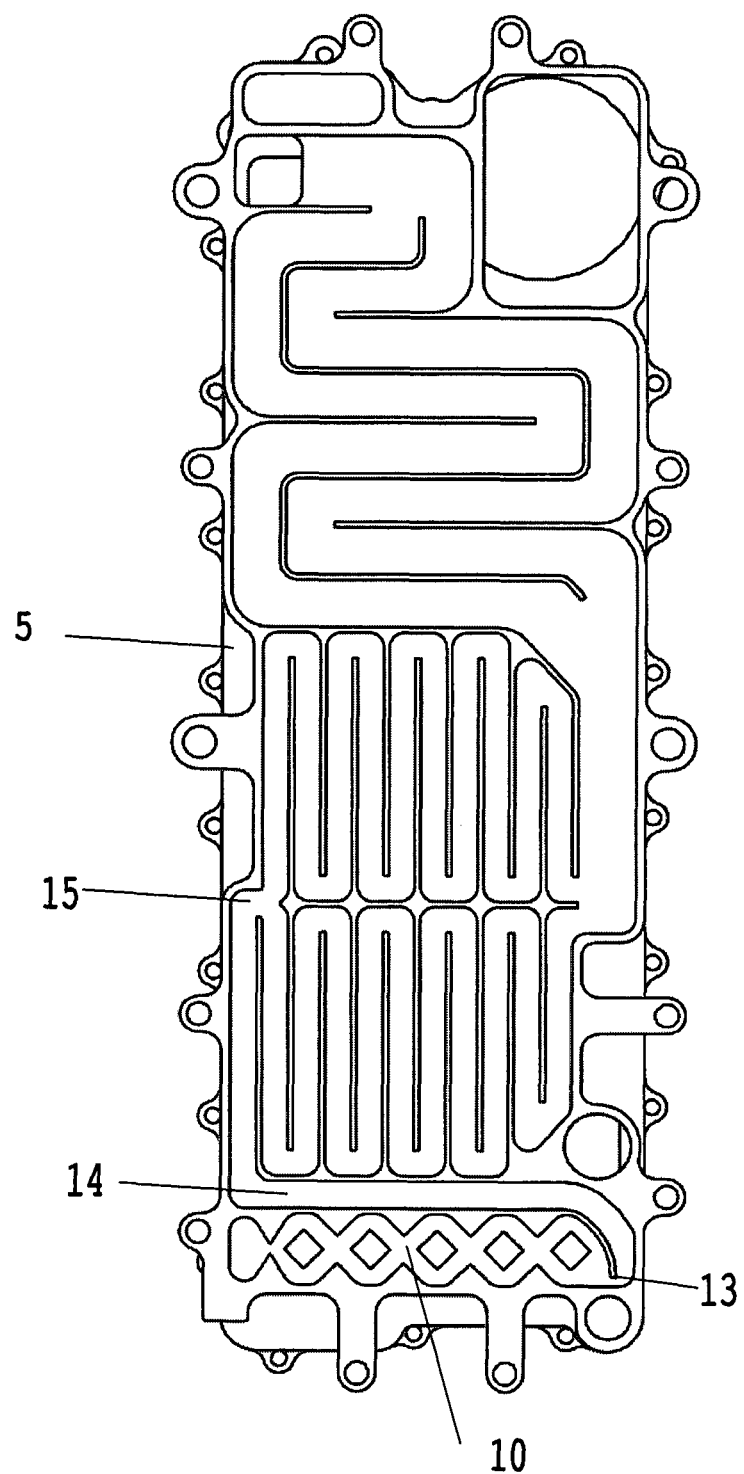
FIG. 2, shows an illustration of an evaporator module for evaporating liquid fuel into gas.
Figure 3:
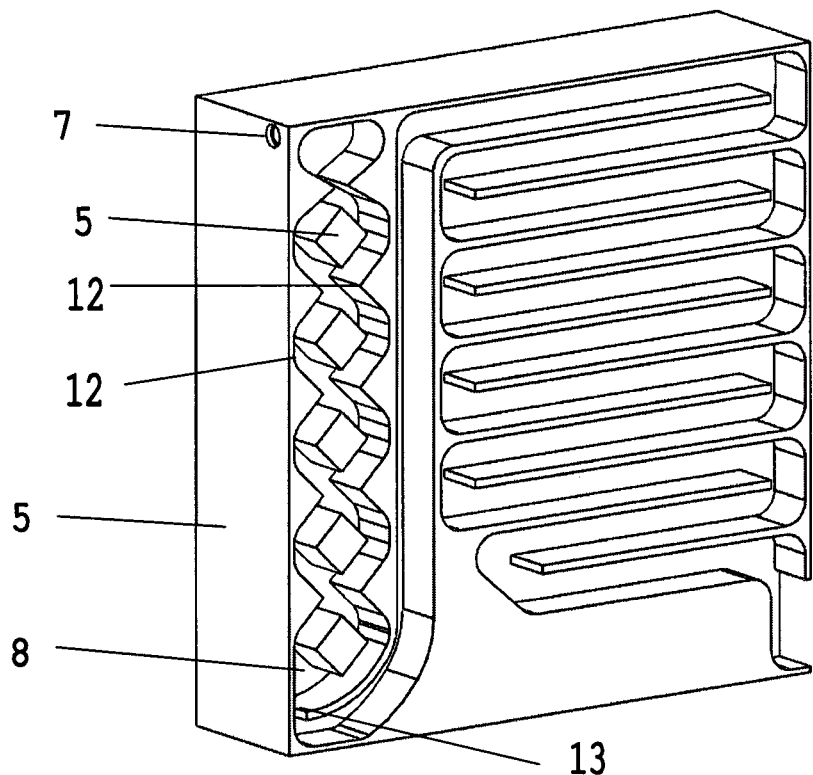
FIG. 3, shows a detailed part of the evaporator module.
Figure 4:
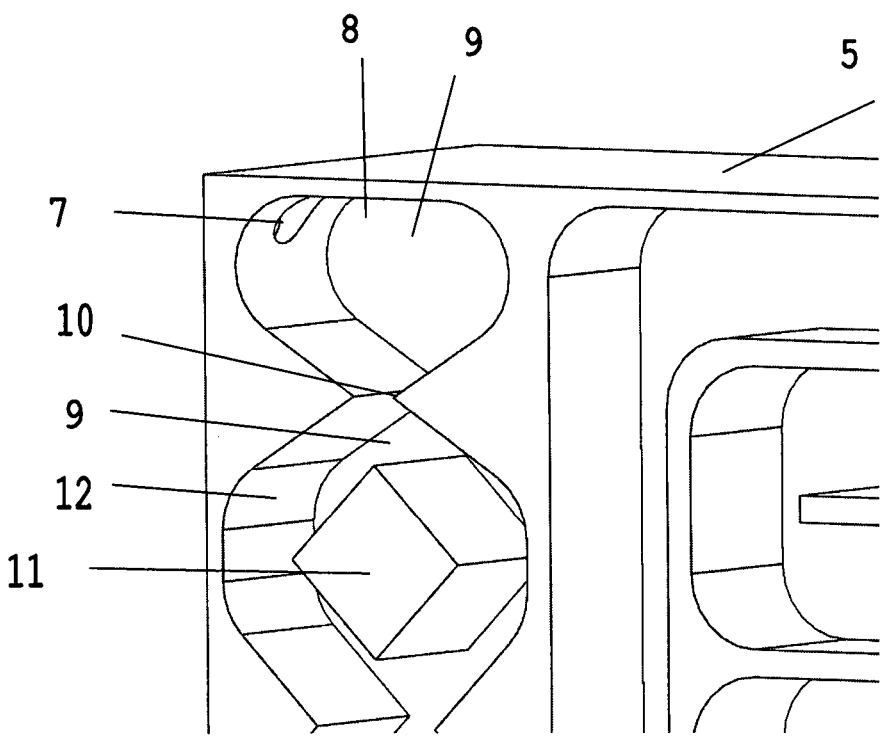
FIG. 4, shows a detailed part of the inlet for liquid fuel in the evaporator module

The evaporator module 5, in shown in FIG. 2 for which a detailed view of the inlet section is shown in FIG. 3 of the drawing and a close up is shown in FIG. 4. The liquid fuel is supplied via the inlet hole 7 of the evaporator module 5. The first part of the evaporator module 5 is formed as a pre-evaporator 8 through which the liquid fuel falls forced by gravity. It has to be observed that the orientation of the evaporator module 5 during operation of the fuel cell system 1 has to be in an upright position. The pre-evaporator 8 is in the present embodiment separated into six chambers 9, which according to specific embodiments could be more or less. When the liquid fuel is supplied via the inlet hole 7, it drops down in the first chamber and is further forwarded to the next chamber via a gap 10. The drop splashes into the next chamber 9 where it will hit a protruding rod. The protruding rod serves partly as a heating element 11, and partly to atomize and evaporate the liquid fuel into droplets and mist. Since the droplets because of gravity fall further down the pre-evaporator 8, more protruding rods are hit and the effect of evaporation is increased. As can be seen from FIG. 4, the walls 12 of the pre-evaporator 8 are vertically angled in order to embrace the protruding rods 11 in such a way that the travel of liquid fuel floating down the walls 12 is prolonged and as most as possible of the liquid fuel is atomized or evaporated. Since the liquid fuel, especially directly after the inlet hole 7, splashes down the pre-evaporator 8, the liquid fuel and the droplets will ricochet from wall 12 to wall 12 and eventually hit the protruding rods 11, the arrangement will help to fully atomize and evaporate the liquid fuel and as such be a fine substitute for a spray injector. It has to be noted that the walls 12 are also heated and forms heating elements for heating and evaporating the liquid fuel. The protruding rods 11, which serves as heating elements, are as well as the walls 12 specially adapted for atomizing the liquid fuel and prolonging the travel of liquid fuel when it floats down the pre-evaporator 8. Experiments have shown that the quadratic shape of the protruding rods 11 have a fine effect on the atomization and evaporation of the liquid fuel. Triangular shapes also works fine. However, more edges support the capture of the drop and thus the time the drop is being subject to heating. Looking at the shapes of the walls and the shape of the rod-like heating elements the edges 15, 16 (FIG. 5) forms noses that enables the fluid fuel to form drops which due to gravity drips further down the evaporator and collide with protruding parts and split into smaller fragments that easier can be atomized into a fine mist.

The gaps 10 also serve as nozzles, that because of the increased pressure helps the liquid fuel to evaporate and to keep the gas phase through the travel of the channel of the evaporator module 5.

Figure 5:
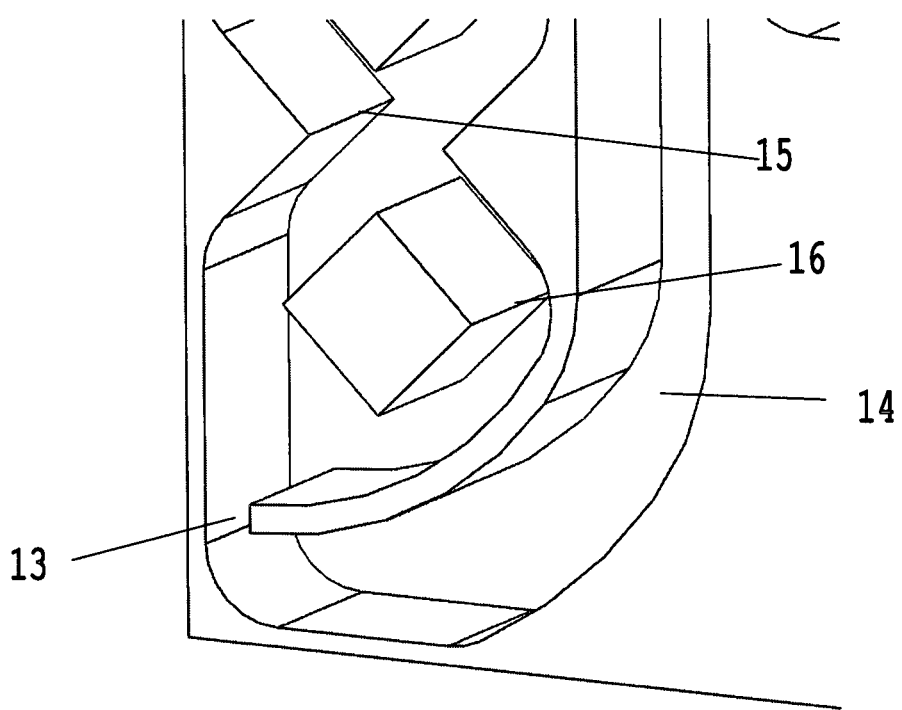
FIG. 5, shows the outlet nozzle for two-phase transformation of the liquid fuel

Looking at FIG. 5, a special pressure nozzle 13 is provided that because of the small passage provides a pressure fall that serves to blow leftovers of atomized liquid fuel further into a vertical channel that is the pathway 14 to the evaporator labyrinth channel 15 in which the atomized and evaporated fuel is further heated into a homogeneous gas mist. Since the pressure through the pressure nozzle 13 is considerable high, the effect is that it serves as a spray injection unit for the evaporator but without the previously mentioned drawbacks since it is a completely integrated feature of the evaporator module 5.

For the understanding of the system, the system components are build as modules that can be fixed together by conventional screws and bolts. Pathways for e.g. exhaust gas are forwarded from module to module in order to take out as much thermal energy as possible and get a high efficacy of the system. Thus the modules can be joined using gaskets in-between as can be seen in FIG. 1 between the evaporator module 5 and reformer module 6.

The modules can be made by machining of a bar of material. In the present embodiment, the evaporator module is provided using a bar of aluminum and carving out the channels for the evaporator on a first side of the bar.

Provided by the invention is an enhanced system for evaporating the liquid fuel using a pre-evaporator, which partly evaporates the fuel, followed by a nozzle which atomizes the fuel into a fine mist, before being passed to the final evaporation zone.

The invention claimed is:

1. A fuel cell system, comprising:
  a fuel cell stack comprising a plurality of proton exchange membrane fuel cells each featuring electrodes in the form of an anode and a cathode for delivering an electric current, wherein a reaction of free hydrogen into ionic form with contact to the anode being proportional to a flow of electric current between the electrodes;
  a catalytic reformer;
  an evaporator for evaporating a mixture of methanol and water to be fed through the catalytic reformer for producing portions of free hydrogen, the evaporator including a first section that serves as a pre-evaporator for receiving the mixture of methanol and water as a liquid fuel;
  wherein the pre-evaporator includes a cavity, the cavity being separated into a plurality of chambers, each chamber comprising a gap for passing the liquid fuel to facilitate partial evaporation and split-up of the liquid fuel into drops, droplets and mist.

2. The system according to claim 1, wherein the cavity includes cavity walls that are shaped in such a way that the cavity walls extend vertically and are angled away from a straight vertical line.

3. The system according to claim 2, wherein the cavity walls are further adapted for serving as heating elements.

4. The system according to claim 1, further comprising at least one protruding rod-formed heating element arranged in the pre-evaporator cavity.

5. The system according to claim 4, wherein the rod-formed heating elements are formed with a plurality of sides.

6. The system according to claim 5, wherein the shape of the sides of the rod-formed heating elements can vary from being flat to a curved or concave form.

7. The system according to claim 4, wherein an edge, formed on the rod-formed heating elements or on the walls, form a nose adapted for letting remaining liquid fuel form a drop.

8. The system according to claim 4, wherein the rod-formed heating elements are arranged in a matrix within the pre-evaporator cavity.

9. The system according to claim 8, wherein the rod-formed heating elements are arranged as a grate comprising at least one rod-formed heating element.

10. The system according to claim 8, wherein several rod-formed heating elements are arranged side by side.

11. The system according to claim 9, wherein the grate is formed as a net with several rod-formed heating elements arranged side by side and at least one rod-formed heating element arranged as a cross member to the side-by-side rod-formed heating elements, the rod-formed heating elements forming joints with each other.

12. The system according to claim 1, wherein each chamber further includes a negative angled, substantially vertical portion of a wall followed by a positive angled substantially vertical portion of a wall followed by a gap that leads to a next one of the chambers.

13. The system according to claim 12, wherein each chamber has two mirrored sets of walls and the rod-like heating elements are arranged in-between the walls.

14. The system according to claim 12, wherein at least one of the gaps between the chambers forms a pressure nozzle for two-phase atomization of the liquid fuel into a following lower pressure one of the chambers.

15. The system according to claim 1, wherein a pressure-reducing nozzle for two-phase atomization of the fuel forms an outlet of the pre-evaporator cavity.

16. A fuel cell system, comprising:
  a fuel cell stack comprising a plurality of proton exchange membrane fuel cells, each fuel cell comprising an anode and a cathode to deliver an electric current, wherein a reaction of free hydrogen into ionic form when contacting the anode is proportional to a flow of electric current between the anode and cathode;

a catalytic reformer;

an evaporator to evaporate a mixture of methanol and water to be fed through the catalytic reformer to produce portions of free hydrogen, the evaporator including a first section that serves as a pre-evaporator to receive the mixture of methanol and water as a liquid fuel, the pre-evaporator facilitating partial evaporation and split-up of the liquid fuel into drops, droplets and mist, the pre-evaporator including a plurality of chambers and a pressure-reducing nozzle, the pressure-reducing nozzle being positioned at an outlet of the pre-evaporator between the first and second sections, the pressure-reducing nozzle providing two-phase atomization of the fuel.

17. The system according to claim 16, wherein the pre-evaporator includes cavity walls that extend vertically and are angled away from a vertical plane.

18. The system according to claim 17, wherein the cavity walls comprise heating elements.

19. The system according to claim 16, further comprising at least one protruding rod-formed heating element arranged in the pre-evaporator cavity.

20. The system according to claim 19, wherein the at least one rod-formed heating element is formed with a plurality of sides.

* * * * *